(12) United States Patent
Chabanne et al.

(10) Patent No.: US 11,436,474 B2
(45) Date of Patent: Sep. 6, 2022

(54) METHOD OF SECURE CLASSIFICATION OF INPUT DATA BY MEANS OF A CONVOLUTIONAL NEURAL NETWORK

(71) Applicant: Idemia Identity & Security France, Courbevoie (FR)

(72) Inventors: Hervé Chabanne, Courbevoie (FR); Vincent Despiegel, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 348 days.

(21) Appl. No.: 16/865,694

(22) Filed: May 4, 2020

(65) Prior Publication Data

US 2020/0356840 A1 Nov. 12, 2020

(30) Foreign Application Priority Data

May 7, 2019 (FR) ...................................... 1904778

(51) Int. Cl.
| | |
|---|---|
| *G06N 3/04* | (2006.01) |
| *G06F 16/55* | (2019.01) |
| *G06F 21/32* | (2013.01) |
| *G06N 3/08* | (2006.01) |

(52) U.S. Cl.
CPC .......... *G06N 3/0454* (2013.01); *G06F 16/55* (2019.01); *G06F 21/32* (2013.01); *G06N 3/0427* (2013.01); *G06N 3/08* (2013.01)

(58) Field of Classification Search
CPC ................................. G06F 16/55; G06F 21/32
See application file for complete search history.

(56) References Cited

U.S. PATENT DOCUMENTS

| | | | |
|---|---|---|---|
| 2019/0279082 A1* | 9/2019 | Moloney | G06N 3/10 |
| 2020/0019759 A1* | 1/2020 | Savchenko | G06N 3/082 |
| 2020/0184308 A1* | 6/2020 | Li | H02J 13/0017 |

OTHER PUBLICATIONS

Yu, H. et al., "Transfer Learning for Face Identification with Deep Face Model," 2016 7th International Conference on Cloud Computing and Big Data (CCBD), dated Nov. 16, 2016, pp. 13-18.

(Continued)

*Primary Examiner* — Edward Park
(74) *Attorney, Agent, or Firm* — Womble Bond Dickinson (US) LLP

(57) ABSTRACT

The present invention relates to a parameter training method for a convolutional neural network, CNN, for classifying data, the method comprising the implementation by data processing means (11c) of servers (1a, 1b, 1c) of steps of:
(a1) Obtaining parameters of a set of at least one first CNN;
(a2) For a first CNN of said set:
  Training, based on a database of already-classified public training data, parameters of a final representation block (B) of a second CNN corresponding to the first selected CNN to which said representation block (B) has been added;
  Retraining, based on a database of already-classified confidential training data of a secondary server (1a, 1b), parameters of the second CNN;
  Transmitting to the main server (1c) parameters of a third CNN corresponding to the second CNN without a final representation block (B);
(a3) Replacing a first CNN of said set of first CNNs with the third CNN;
(a4) Aggregating said set of at least one first CNN into a fourth CNN.
The present invention also relates to a method for classifying an item of input data.

14 Claims, 3 Drawing Sheets

(56) References Cited

OTHER PUBLICATIONS

Pihur, V. et al., "Differentially-Private "Draw and Discard" Machine Learning," arXiv.org, Computer Science—Cryptography and Security, Cornell University Library, vol. arXiv:1807.04369v1, Submitted on Jul. 11, 2018, pp. 1-11.

Pihur, V. et al., "Differentially-Private "Draw and Discard" Machine Learning," arXiv.org, Computer Science—Cryptography and Security, Cornell University Library, vol. arXiv:1807.04369v2, last revised on Oct. 10, 2018, pp. 1-15.

Ben-Nun, T. et al., "Demystifying Parallel and Distributed Deep Learning: An In-Depth Concurrency Analysis," arXiv.org, Computer Science—Machine Learning, Cornell University Library, retrieved from the Internet URL: https://arxiv.org/pdf/1802.09941v1.pdf, submitted on Feb. 26, 2018, pp. 1-60.

Papernot, N. et al., "Semi-supervised Knowledge Transfer for Deep Learning from Private Training Data," arXiv.org, Statistics—Machine Learning, Cornell University Library, Published as a conference paper at ICLR 2017, vol. arXiv:1610.05755v4, last revised on Mar. 3, 2017 (this version, v4), pp. 1-16.

Correspondence from the French National Institute of Industrial Property Office (INPI—Institute National De La Propriété Industrielle) for FR1904778 dated Mar. 11, 2020; Preliminary Research Report of the French National Institute of Industrial Property Office for FR1904778 dated Mar. 9, 2020; and Written Opinion on the Patentability of the Invention issued by the French National Institute of Industrial Property Office for FR1904778.

English machine translation of Correspondence from the French National Institute of Industrial Property Office (INPI—Institute National De La Propriété Industrielle) for FR1904778 dated Mar. 11, 2020; Preliminary Research Report of the French National Institute of Industrial Property Office for FR1904778 dated Mar. 9, 2020; and Written Opinion on the Patentability of the Invention issued by the French National Institute of Industrial Property Office for FR1904778.

* cited by examiner

[Fig. 1]
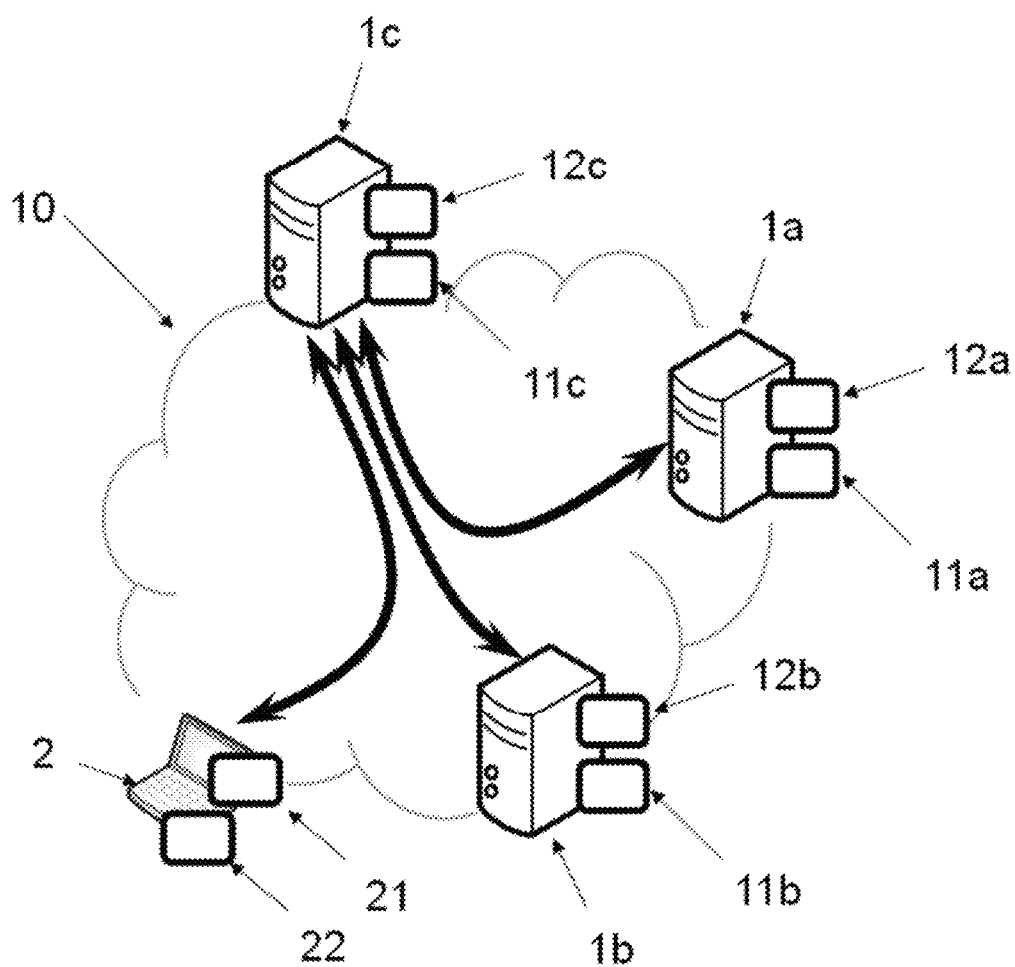

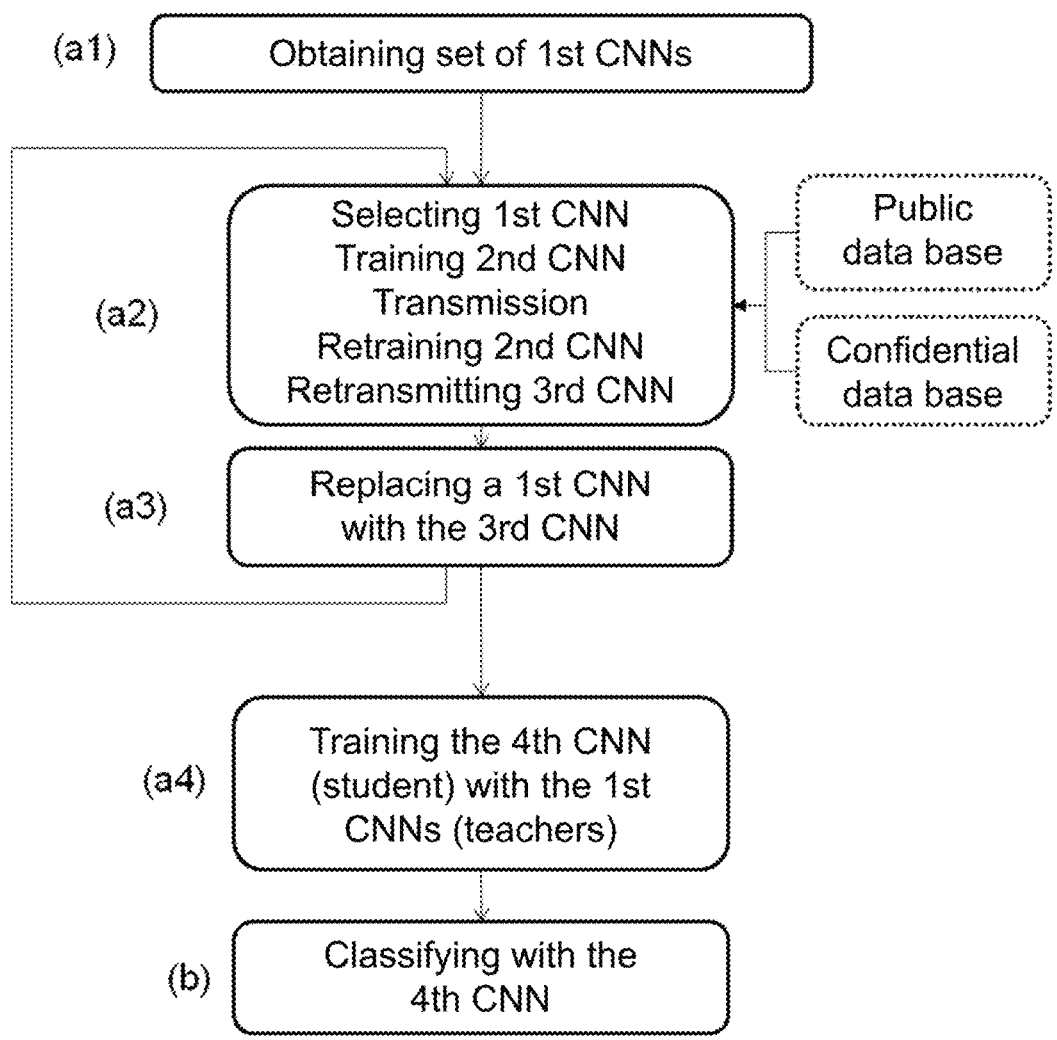
[Fig. 2]

[Fig. 3]
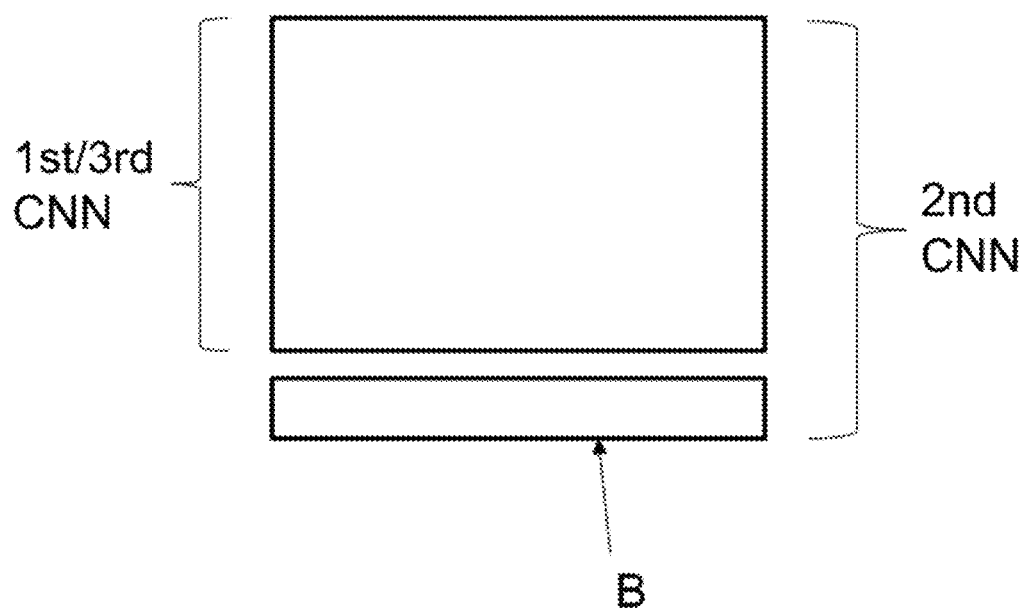

METHOD OF SECURE CLASSIFICATION OF INPUT DATA BY MEANS OF A CONVOLUTIONAL NEURAL NETWORK

CROSS-REFERENCE TO RELATED APPLICATIONS

This specification is based upon and claims the benefit of priority from French patent application number FR 1904778 filed on May 7, 2019, the entire contents of which are incorporated herein by reference.

GENERAL TECHNICAL FIELD

The present invention relates to the field of biometrics, and in particular to a method of secure classification of input data by means of a convolutional neural network, for authentication/identification.

STATE OF THE ART

Neural networks are massively used for data classification.

After an automatic training phase (generally supervised, meaning on an already classified reference database), a neural network "learns" and becomes capable on its own of applying the same classification to unknown data.

Convolutional neural networks (CNN) are a type of neural network wherein the connection pattern between neurons is inspired by the visual cortex of animals. They are thus particularly suited to a specific type of classification, which is image analysis; indeed they allow efficient recognition of people or objects in images or videos, in particular in security applications (e.g. automatic surveillance, threat detection, etc.).

In particular, the use of CNN is known in the field of police and antiterrorism. More specifically, police forces have databases of photographs, for example faces of individuals involved in cases. It is then possible to train CNN's to recognize faces in video surveillance data, particularly for detecting wanted individuals. Similarly, it can be imagined that governments have biometric databases, for example passport fingerprints. It is then possible to train CNN's to recognize prints of individuals in particular.

Currently, one problem that arises is that these databases are confidential, and restricted, (particularly national ones). Yet it would be desirable for example for police forces of several states to cooperate and improve the overall efficiency of recognition, although without being able to go back to the confidential data.

However, in every case this would involve an entity (for example the police forces of a state) training their CNN's on the databases of another entity (the police forces of another state), i.e. the databases of photographs or other biometric traits are transmitted unencrypted, which is not currently feasible.

A clever solution has been proposed in application FR1852351 which, in spite of there being no common feature space, makes it possible to learn from "teachers" on each of the sets of confidential data, so as to be able to jointly train a "student" who in the end will have the knowledge from several sets of confidential data.

More specifically, the teachers will generate a training database for the student by classifying the raw public data thanks to a "voting" system of the teachers, perturbed where appropriate to avoid being able to go back to the individual sets of confidential data used in training the teachers.

Such a technique is wholly satisfactory, but has the drawback that training, for each database, takes place in an isolated fashion. It then becomes possible to conceive that although the images that were used for training are individually protected, national biometric characteristics may nonetheless leak. Another problem comes from the fact that the teachers must be manipulated at a central level in order for the student to learn, and that at this level there may be security flaws.

Thus, the situation may still be improved.

BRIEF DESCRIPTION OF THE INVENTION

According to a first aspect, the present invention relates to a parameter training method for a convolutional neural network, CNN, for classifying data, the method comprising the implementation of steps of:
(a1) Obtaining, by data processing means of a main server, parameters of a set of at least one CNN;
(a2) For a first CNN of said set:
 Training, by the data processing means of said main server or data processing means of a secondary server having a database of already-classified confidential training data, based on a database of already-classified public training data, parameters of a final representation block of a second CNN corresponding to the first CNN to which said representation block has been added;
 Retraining, by data processing means of said secondary server, based on its database of already-classified confidential training data, parameters of the second CNN;
 Transmitting to the main server parameters of a third CNN corresponding to the second CNN without a final representation block;
(a3) Replacing, by the data processing means of the main server, a first CNN of said set of first CNNs with the third CNN;
(a4) Aggregating said set of at least one first CNN into a fourth CNN.

According to other advantageous and nonlimiting characteristics:
 said data are personal data, particularly biometric data, particularly facial images;
 steps (a2) and then (a3) are implemented for a plurality of secondary servers each having a database of already-classified confidential training data;
 steps (a2) and then (a3) are repeated a given number of times so as to update said set of first CNNs;
 the retraining in step (a2) of the parameters of the transmitted second CNN comprises the introduction of noise;
 said set obtained in step (a1) comprises a plurality of first CNNs, step (a2) being implemented for a first CNN randomly selected from said set, and the first CNN replaced by the third CNN in step (a3) being randomly selected from said set;
 the first CNNs randomly selected in steps (a2) and (a3) are selected independently of one another;
 step (a4) comprises processing data from a second database of not-yet-labeled public data, independently by each of the first CNNs, and aggregating the results of this processing; and then training, from the second database of public training data now labeled with the aggregated results, the parameters of said fourth CNN;
 the results of processing an item of data from a second database of public data by the first CNNs are feature vectors, the aggregation of the results of this processing consisting of averaging the obtained feature vectors;

said representation block of the second CNN establishes a correspondence of a feature space of the first CNN to a classification space;

said representation block consists of a fully connected layer;

either the training of the parameters of the final representation block of the second CNN is implemented by the data processing means of said main server, and step (a2) comprises the subsequent transmission to said secondary server of the parameters of said second CNN, or the training of the parameters of the final representation block of the second CNN is implemented by the data processing means of said secondary server, and step (a2) comprises the prior transmission to said secondary server of the parameters of said first CNN.

According to a second aspect, the invention proposes a classification method for input data, characterized in that it comprises the implementation of steps of:

(a) Training a fourth CNN in accordance with the method according to the first aspect;

(b) Classifying said input data by the data processing means of the terminal, using the fourth CNN.

According to a third and fourth aspect, the invention relates to a computer program product comprising code instructions for executing a method according to the first aspect of parameter training for a convolutional neural network, CNN, or according to the second aspect of classifying an input data item; and a storage means readable by computer equipment in which a computer program product comprises code instructions for executing a method according to the first aspect of parameter training for the convolutional neural network, CNN, or according to the second aspect of classifying an input data item.

DESCRIPTION OF THE FIGURES

Other characteristics and advantages of the present invention will appear upon reading the following description of a preferred embodiment. This description will be given with reference to the attached drawings in which:

FIG. 1 is a diagram of an architecture for implementing the methods according to the invention;

FIG. 2 schematically shows the steps of the training method according to the invention;

FIG. 3 schematically depicts how the first, second, and third CNNs used in the methods according to the invention are defined relative to one another.

DETAILED DESCRIPTION

Architecture

According to two additional aspects of the invention, the following is proposed:

a parameter training method for a convolutional neural network (CNN) for data classification; and a method for classifying input data using a CNN trained via the first method.

These two types of methods are implemented within an architecture such as shown in FIG. 1, by means of one or more servers $1a$, $1b$, $1c$ and a terminal 2. The one or more servers $1a$, $1b$, $1c$ are the training devices (implementing the first method) and the terminal 2 is a classification device (implementing the second method), such as a device for processing video surveillance data.

In any case, each device $1a$, $1b$, $1c$, 2 is typically remote computer equipment connected to a wide-area network 10 such as the Internet for the exchange of data. Each comprises processor type data processing means $11a$, $11b$, $11c$, 21 and data storage means $12a$, $12b$, $12c$, 22 such as computer memory, for example a drive.

A server $1c$ is a so-called main server that does not have a training database (or at least no confidential database, but as we shall see, it has access to at least one first database of public training data). The role of said server $1c$ can easily be performed by either of servers $1a$, $1b$, but it is preferably a different server (i.e. partitioned) to avoid any risk of disclosing the confidential databases of the servers $1a$, $1b$. Similarly, the terminal 2 may be combined with the main server $1c$.

This is because at least one of the servers $1a$, $1b$, a so-called secondary (or "client") server, stores a database of confidential training data, i.e. a set of already-classified data (in contrast to the data called input, which is in fact to be classified). Preferably, there are at least two databases of already-classified confidential training data, stored on two different secondary servers ($1a$ and $1b$ in FIG. 1), with no interactions: the server $1a$ cannot access the database of the server $1b$ and vice-versa.

For example, it involves the databases of national police forces of two states, As such, said input or training data are preferentially personal data, i.e. personal to an individual (for which confidentiality is therefore necessary), and in particular either biometric data (which by definition are personal to their owner), or alphanumeric personal data (typically last name, given name, date and place of birth, address, etc.). It should be noted that the data will not be limited to these two types of personal data, which may for instance include a signature, a seal, etc.

Generally speaking, the classification of personal data is typically the recognition of the individual in question, and as such the present method for classifying personal input data may be a method of identifying/authenticating an individual by means of an item of personal data of said individual.

It should be noted that this method is not limited to personal data, and the input or training data may represent images, sounds, etc. (said classification being recognition of an object, of an animal, etc.).

In the preferred embodiment of biometric data, the input or training data again typically represent images, or are directly images of biometric traits (faces, fingerprints, irises, etc.), or directly preprocessed data drawn from biometric traits (for instance, the position of minutiae in the case of fingerprints). The remainder of this description will cover the example of images of faces, but it shall be understood that it is not limited to such an embodiment.

Generally speaking, personal data, and in particular biometric data, are "non-quantifiable" data (in the sense that a face or fingerprint has no numerical value), for which there is no common feature space.

CNN

A CNN generally comprises four types of layers successively processing information:

the convolution layer which processes blocks from the input one after the other;

the nonlinear layer with which to add nonlinearity to the network and therefore to have much more complex decision functions;

the pooling layer with which to combine several neurons into a single neuron;

The fully connected layer which connects all the neurons from one layer to all the neurons of the preceding layer.

The non-linear layer NL activation function is typically the ReLU function (Rectified Linear Unit) which is equal to f(x)=max(0, x) and the most used pooling layer (labeled POOL) is the function MaxPool2×2 which corresponds to a maximum between four values of a square (four values are pooled into one).

The convolution layer, labeled CONV, and the fully connected layer, labeled FC, generally correspond to a scalar product between the neurons of the preceding layer and the weight from the CNN.

Typical CNN architectures stack several pairs of CONV→NL layers and then add a POOL layer and repeat this plan [(CONV→NL)$^p$→POOL] until getting a sufficiently small size output factor, and then ending by two fully connected FC layers.

This is a typical CNN architecture:
INPUT→[[CONV→NL]$^p$→POOL]$^n$→FC→FC

In the context of this method, it is possible in particular to use the CNNs as proposed in the documents Omkar M. Parkhi, Andrea Vedaldi, Andrew Zisserman: Deep Face Recognition. BMVC 2015, and Deep Visage: Making face recognition simple yet with powerful generalization skills. Abul Hasnat, Julien Bohne, Jonathan Milgram, Stephane Gentric, Liming Chen, ICCV 2017, as these networks are particularly effective for facial recognition.

Principle

So-called federated learning algorithms, which make it possible to preserve data confidentiality, are known. For instance, the document H. Brendan McMahan, Daniel Ramage, Kunal Talwar, Li Zhang *Learning Differentially Private Recurrent Language Models*. https://arxiv.org/pdf/1710.06963v3.pdf, makes it possible to train LSTM (Long Short-Term Memory) models used in language recognition, by successively submitting a shared model to multiple users (secondary servers).

More specifically, for a group of selected secondary servers, each one generates an update of a received model based on all or some of its confidential data in the form of a vector, which is "clipped" (i.e. averaged if warranted) so as to set its norm bound, and perturbed.

More recently, a novel learning algorithm was proposed in the document Vasyl Pihur, Aleksandra Korolova, Frederick Liu, Subhash Sankuratripati, Moti Yung, Dachuan Huang, Ruogu Zeng. Differentially-Private "Draw and Discard" Machine Learning. https://arxiv.org/pdf/1807.04369v2.pdf.

This "Draw and Discard" algorithm makes it possible to train GLM (Generalized Linear Model) models. The GLM generalizes linear regression by enabling the linear model to be linked to the response variable via a link function and by authorizing the amplitude of the variance of each measure to be a function of its planned value. The algorithm proposes to initialize a set of k models, and in a repeated fashion, to update in the database of confidential data a model chosen randomly (by noising this training) and then replacing a model of the set chosen randomly (not necessarily the same one) with the updated model. The selection of the model to be updated is the "draw" and the replacement of a model is the "discard". After a certain number of iterations, the models may be aggregated.

These techniques are satisfactory, but cannot be used for identifying/authenticating individuals, because there is no common feature space. More specifically, the various confidential databases relate to different people: It is not possible to simply transfer a model from one secondary server to another for an update, because the individuals from other databases are mutually unknown to them.

The present training method proposes a clever solution for solving the problem of there not being a common feature space.

Training Method

According to a first aspect, the training method implemented by the data processing means 11a, 11b, 11c of at least one secondary server 1a, 1b and the main server 1c is proposed, with reference to FIG. 2.

The training method begins with a "preparatory" step (a1) of obtaining, by the data processing means 11c of a main server 1c, parameters of at least one first CNN, preferentially a plurality of first CNNs, forming a set of k first CNNs, where k is typically between 10 and 30, and advantageously about 20.

It is understood that this is an initialization step implemented in any possible way, in which the first CNNs may be taken as-is (with parameter values chosen arbitrarily and/or randomly) or pre-trained, for instance, on a public training database (see below).

All of the first CNNs advantageously have the same architecture, and preferentially are feature extraction CNNs ("features" referring to characteristics, i.e. distinguishing traits), in particular biometric ones, and not necessarily from a classification CNN. More specifically, the first CNNs are not necessarily capable of returning a classification result for an item of data, but at least can produce a representation of the features of that item of data in a representation space (called a "feature space"). To put it another way, the first CNNs have as their output not an input data classification result, but rather a feature vector representing (in abstract fashion) the input data in said feature space.

In a step (a2) the "draw" will be implemented. The step (a2) is thereby implemented for a first CNN of said set, selected randomly if warranted. Naturally, if the set comprises only one first CNN, that one will automatically be selected. It shall be understood in this regard that step (a2) (with step (a3) which will be described later on) may be repeated a large number of times, in particular hundreds or even thousands of times.

Normally, in accordance with the draw mechanism, the parameters of the first CNN should be transmitted to a secondary server 1a, 1b having a training database of already-classified confidential data, for an update.

However, each first CNN potentially has its own feature space, so that such an update is impossible. Thus, we will cleverly turn the first selected CNN into a second CNN, so that regardless of the feature space of the first CNN, all of the second CNNs will have a common feature space.

In order to achieve this, beginning with what this time is a database of already-classified public training data (which will be called the first public database to distinguish it from a possible database of public training data in which the data is not yet classified, which will be used in a particular embodiment), the main server 1c or the secondary server 1a, 1b learns parameters from a final representation block B of a second CNN corresponding to the first selected CNN, to which said representation block B has been added.

In the case of multiple implementations of the step (a2), the substep of turning each selected CNN into a second CNN is implemented using the same first database of already-classified public training data so as to train the parameters of a plurality of second CNNs, all of the second CNNs advantageously having the same architecture again.

With reference to FIG. 3, it is understood that the second CNNs correspond to first CNNs each supplemented by the final block B, called the representation block (or IP layer, for "Inner Product"). More specifically, the first CNNs are given a common classification capability (in said first public database) based on their ability to extract features. This results in a common feature space of classifications. It is understood that the representation block B may take on numerous forms, in particular at least one fully connected layer FC and preferentially exactly one final layer FC. Generally speaking, the representation block B "maps" (i.e. establishes a match) the feature space of the first CNN onto the classification space.

This substep must be understood as a step of training only the parameters missing from the second CNNs, i.e. the parameters already trained for the first CNNs are kept, and those networks are "retrained" so as to train the representation block B, and this on the same data, which forces the appearance of the common space. Advantageously, this training is not noised, because the data is public; hence doing so is not necessary.

A person skilled in the art will know how to use any database of already-classified public data to implement this substep (and if warranted, when initializing the first CNNs), with the understanding that "public" means that the data are not confidential and can be freely shared. The first public database is different from each of the confidential databases. Either this first public database can be specially created, or an available database can be used. In the event that the data are photographs of faces, we can cite, for example, the IMDB database (Internet Movie DataBase), from which it is possible to extract images of N=2622 individuals with up to 1000 images per individual, see Omkar M. Parkhi, Andrea Vedaldi, Andrew Zisserman: *Deep Face Recognition.* BMVC 2015.

It should be noted that the trained classification can give more than just a simple binary response, and can graduate the responses in order to obtain nuances that can be utilized by also knowing which are the closest classes, see the document Geoffrey Hinton, Oriol Vinyals, Jeff Dean: *Distilling the Knowledge in a Neural Network. NIPS* 2014. This simply means that where a conventional classification determines THE class it considers to be that of the input data (for example the name of the person in a photo), the present classification can indicate one or more potential classes, potentially with a confidence percentage.

If it is the central server 1c that implemented the training of the parameters of the final representation block B of the second CNN, the parameters of the second CNN that is obtained (for the first CNN selected, i.e. the parameters of the first CNN initially available, plus the newly trained parameters of the representation block B) are transmitted to said secondary server 1a, 1b having a database of already-classified confidential training data. Alternatively, the parameters of the selected first CNN are transmitted upstream to said secondary server 1a, 1 b, and it is the data processing means 11a, 11 b of the latter that implement the training of the parameters of the final representation block B of the second CNN.

It should be noted that if there is a plurality of secondary servers 1a, 1 b, it is possible either to randomly select the one to which the transmission (of the parameters of the selected first CNN or the trained second CNN) is performed, or to go through them in turn.

Next, step (a2) comprises retraining, by the data processing means 11a, 11 b of said secondary server 1a, 1 b, based on its database of already-classified confidential training data, parameters of the second transmitted CNN. In other words, the secondary server 1a, 1 b that received or trained the second CNN updates it based on its confidential data. Note that all or part of the database is used, in particular a batch of chosen size. All or part of the parameters of the second CNN may be locked during this retraining (particularly those of the very first layers) to increase efficiency, but the entire network is preferably retrained, which is called fine-tuning.

Preferably, retraining comprises the introduction of noise, so as to avoid being able to go back to the confidential databases of the secondary servers 1a, 1 b. A person skilled in the art may refer to the noising techniques proposed in the document H. Brendan McMahan, Daniel Ramage, Kunal Talwar, Li Zhang Learning Differentially Private Recurrent Language Models or the document Vasyl Pihur, Aleksandra Korolova, Frederick Liu, Subhash Sankuratripati, Moti Yung, Dachuan Huang, Ruogu Zeng. *Differentially-Private "Draw and Discard" Machine Learning* (and generally speaking implement any other feature of the learning technique described in this document) or any other known "differential privacy" technique.

At the end of retraining, only the parameters of a third CNN corresponding to the second CNN without the final representation block B are retransmitted to the main server 1a, 1 b. In other words, only the parameters of the second CNN corresponding to the layers from the start to the representation block are returned.

It is therefore understood that the third CNN obtained has exactly the same structure as the selected first CNN and corresponds to that first CNN updated. Its feature space has changed and is now "a little more common", since new data have been taken into consideration.

It may therefore be put back into said set of first CNNs, in accordance with the "discard" mechanism.

Thus, in the step (a3), the data processing means 11c of the main server 1c replace in said set of first CNNs a first CNN selected randomly, if warranted, with the third CNN. As previously explained, this random selection of a first CNN is preferentially independent of the random drawing of a first CNN in step (a2). Thus, there is a 1/k probability of replacing the first CNN already selected in step (a2), i.e. updating it (as a reminder, the third CNN corresponds to the updated first CNN selected), but there is a (k−1)/k probability of replacing another first CNN. Naturally, if said set comprises only one first CNN, this CNN will be the one replaced.

The third CNN is then considered, for the remainder of the method, to be a first CNN in its own right (i.e. the set of first CNNs is updated), and steps (a2) and then (a3) may be repeated as explained on the new set of first CNNs. It is entirely possible that the third CNN is, in other instances of steps (a2) and (a3), selected to be updated again or replaced with another third CNN. The secondary servers 1a, 1b preferably implement at the same time and independently, on their confidential database, step (a2): first CNNs are randomly selected for each of the secondary servers 1a, 1 b and third CNNs are received in response for each one of them.

In a step (a4) said set of first CNNs is aggregated. It is understood that at this stage said set of first CNNs has been updated a very large number of times, so that the probability that an original first CNN remains is infinitesimal. All of the CNNs that are present have undergone retraining multiple times in accordance with step (a2), so that it may be assumed that their feature spaces have converged (although in practice they will never be identical).

Aggregation refers to obtaining from said set a single CNN, called the fourth CNN, for use in classification.

A first simple embodiment of step (a4) may consist of simply taking as a fourth CNN any first CNN from said set. If the set contains only one CNN, it is taken as the fourth CNN.

Alternatively, if there is a plurality of first CNNs and if all these networks are to be consolidated, another approach will be to first train the transformation matrices of the feature spaces of the various first CNNs in order to make the first k CNNs work in the same space. This will make it possible to have a consolidated feature vector by averaging the outputs of the k networks.

A "teacher/student" approach may therefore be planned, in order to train a fourth CNN which, based on an item of input data, must reproduce the average of the feature vectors output by each of the k first CNNs.

To do so, the process is advantageously similar to what is proposed in the document Nicolas Papernot, Martin Abadi, Úlfar Erlingsson, Ian Goodfellow, Kunal Talwar: Semi-supervised Knowledge Transfer for Deep Learning from Private Training Data. ICLR 2017, or in the application FR1852351, which use this teacher/student approach.

More specifically, the first CNNs constitute k teachers who will be able to train a student.

Step (a4) therefore comprises the processing of data from a second database of not-yet-labeled public data, by means of said first CNNs (the result being a classification of the input data or simply a feature vector), then the training, based on the second database of public training data now associated with the result of said processing, meaning that they have been labeled (i.e. classified or associated with a feature vector), of the parameters of the fourth CNN. In one classification case, the fourth CNN again comprises a final representation block B (in particular an FC layer), and therefore preferentially has an architecture similar to that of the second CNNs.

In a known fashion, step (a4) preferentially comprises, for each item of data from said second public database, the processing of this data independently by each of the first CNNs, and the aggregation of the results of this processing, i.e. the votes of the teachers. In the event that the results are feature vectors, the votes of the k teachers advantageously consist of averaging the k representation vectors obtained.

Again, this step may comprise introducing noise into the classification results before aggregation, but this is not mandatory as it is already impossible to go back to the confidential databases of the secondary servers 1a, 1 b. In fact, the entirety of step (a4) is implemented in the main server 1c which has all of the first CNNs, and the secondary servers 1a, 1 b are no longer solicited.

Finally, when the fourth CNN, i.e. the student, is obtained, its final representation block B may be eliminated to return to a feature extraction CNN.

Classification Method

According to a second aspect, a method is proposed for classifying an item of input data, implemented by the data processing means 21 of the terminal 2.

The classification method comprises two steps: in a first step (a), a fourth CNN is trained as defined previously, and in a second step (b), the data processing means 21 of the terminal 2 classify said input data, by means of the fourth CNN.

This method is implemented conventionally; it is understood that just as explained, knowing only the fourth CNN, it is impossible to go back to the confidential databases that enabled the training of the first CNNs.

Computer Program Product

According to third and fourth aspects, the invention relates to a computer program product comprising code instructions for executing (in particular on data processing means 11a, 11 b, 11c, 21 of one or more servers 1a, 1b, 1c or of the terminal 2) a method according to the first aspect of the parameter training invention for a CNN or a method according to the second aspect of the invention for classifying an item of input data, as well as computer-readable storage means (a memory 12a, 12b, 12c, 22 of one or more servers 1a, 1 b, 1c or of the terminal 2) on which this computer program product is located.

The invention claimed is:

1. A parameter training method for a convolutional neural network, CNN, for classifying data, the method comprising the implementation of steps of:
   (a1) Obtaining, by data processing means (11c) of a main server (1c), parameters of a set of at least one CNN;
   (a2) For a first CNN of said set:
      Training, by the data processing means (11c) of said main server (1c) or data processing means (11a, 11b) of a secondary server (1a, 1b) having a database of already-classified confidential training data, based on a database of already-classified public training data, parameters of a final representation block (B) of a second CNN corresponding to the first CNN to which said representation block (B) has been added;
      Retraining, by data processing means (11a, 11b) of said secondary server (1a, 1b), based on its database of already-classified confidential training data, parameters of the second CNN;
      Transmitting to the main server (1c) parameters of a third CNN corresponding to the second CNN without a final representation block (B);
   (a3) Replacing by the data processing means (11c) of the main server (1c) a first CNN of said set of first CNNs with the third CNN;
   (a4) Aggregating said set of at least one first CNN into a fourth CNN.

2. The method according to claim 1, wherein said data are personal data, in particular biometric data, in particular facial images.

3. The method according to claim 1, wherein steps (a2) and then (a3) are implemented for a plurality of secondary servers (1a, 1b) each having a database of already-classified confidential training data.

4. The method according to claim 1, wherein steps (a2) and then (a3) are repeated a given number of times so as to update said set of first CNNs.

5. The method according to claim 1, wherein the retraining in step (a2) of the parameters of the transmitted second CNN comprises the introduction of noise.

6. The method according to claim 1, wherein said set obtained in step (a1) comprises a plurality of first CNNs, step (a2) being implemented for a first CNN randomly selected from said set, and the first CNN replaced by the third CNN in step (a3) being randomly selected from said set.

7. The method according to claim 6, wherein the first CNNs randomly selected in steps (a2) and (a3) are selected independently of one another.

8. The method according to claim 1, wherein step (a4) comprises processing data from a second database of not-yet-labeled public data, independently by each of the first CNNs, and aggregating the results of that processing; and then training, from the second database of public training data now labeled with the aggregated results, the parameters of said fourth CNN.

9. The method according to claim 8, wherein the results of processing an item of data from a second database of public data by the first CNNs are feature vectors, the aggregation of the results of this processing consisting of averaging the obtained feature vectors.

10. The method according to claim 1, wherein said representation block (B) of the second CNN establishes a correspondence of a feature space of the first CNN to a classification space.

11. The method according to claim 1, wherein said representation block (B) consists of a fully connected layer.

12. The method according to claim 1, wherein either the training of the parameters of the final representation block (B) of the second CNN is implemented by the data processing means (11c) of said main server (1c), and step (a2) comprises the subsequent transmission to said secondary server (1a, 1b) of the parameters of said second CNN, or the training of the parameters of the final representation block (B) of the second CNN is implemented by the data processing means (11a, 11b) of said secondary server (1a, 1b), and step (a2) comprises the prior transmission to said secondary server (1a, 1 b) of the parameters of said first CNN.

13. A classification method for input data, characterized in that it comprises the implementation of steps of:
(a) Training a fourth CNN in accordance with the method according to claim 1;
(b) Classifying said input data by the data processing means (21) of the terminal (2), using the fourth CNN.

14. A storage means readable by computer equipment in which a computer program product comprising code instructions for the execution of a method according to claim 1 for parameter training for a convolutional neural network, CNN, or for classification of an input data item.

* * * * *